United States Patent [19]

Ishihara et al.

[11] Patent Number: 4,990,580

[45] Date of Patent: * Feb. 5, 1991

[54] PROCESS FOR PRODUCTION OF STYRENE POLYMERS

[75] Inventors: Nobuhide Ishihara; Masahiko Kuramoto; Michitake Uoi, all of Sodegaura, Japan

[73] Assignee: Idemitsu Kosan Company Limited, Tokyo, Japan

[*] Notice: The portion of the term of this patent subsequent to Feb. 14, 2006 has been disclaimed.

[21] Appl. No.: 405,083

[22] Filed: Sep. 7, 1989

Related U.S. Application Data

[63] Continuation of Ser. No. 141,589, Jan. 7, 1988, abandoned.

[30] Foreign Application Priority Data

Jan. 22, 1987 [JP] Japan ................... 62-11447

[51] Int. Cl.$^5$ .................. C08F 4/642; C08F 12/08
[52] U.S. Cl. ..................... 526/160; 526/165; 526/347.2; 526/905
[58] Field of Search ........... 526/138, 165, 160

[56] References Cited

U.S. PATENT DOCUMENTS

| | | | |
|---|---|---|---|
| 3,070,577 | 12/1962 | Stogryn et al. | 526/334 |
| 3,207,740 | 9/1965 | Cheney | 526/138 |
| 3,489,737 | 1/1970 | Natta et al. | 526/293 |
| 4,404,344 | 9/1983 | Sinn et al. | 526/351 |
| 4,456,695 | 6/1984 | Nimura et al. | 526/119 |
| 4,522,982 | 6/1985 | Ewen | 526/351 |
| 4,542,199 | 9/1985 | Kaminsky et al. | 526/351 |

FOREIGN PATENT DOCUMENTS 47-6406 2/1972 Japan ................... 526/165

OTHER PUBLICATIONS

Macromolecules–Crystalline Syndiotactic Polystyrene, vol. 19, pp. 2464–2465, Sep. 1986.
Vysokomol Soedin B 1973, 15(8), 612–615 and translation.

Primary Examiner—Edward J. Smith
Attorney, Agent, or Firm—Frishauf, Holtz, Goodman & Woodward

[57] ABSTRACT

A process for production of styrene polymers is disclosed, comprising polymerizing styrene monomers by the use of a catalyst comprising (a) a titanium compound and (b) a contact product of an organoaluminum compound and a condensing agent, and further in the presence of hydrogen. The styrene polymers produced by the present process have a stereo structure that substituent groups are mainly in the syndiotactic configuration. Thus the styrene polymers have high heat resistance and high solvent resistance as compared with atactic polystyrene commonly used and are useful as materials for production of articles for which high heat resistance and high solvent resistance are required.

10 Claims, No Drawings

PROCESS FOR PRODUCTION OF STYRENE POLYMERS

This application is a continuation of application Ser. No. 07/141,589, filed Jan. 7, 1988, now abandoned.

BACKGROUND OF THE INVENTION

1. Field of the Invention

The present invention relates to a process for production of styrene polymers, and more particularly to a process for efficiently producing styrene polymers having such a stereo structure that side chains are mainly in the syndiotactic configuration.

2. Description of the Related Art

Polymers of vinyl compounds having substituent groups can be divided into three groups depending on the configuration of substituent groups, i.e., side chains of the polymers: isotactic, syndiotactic and atactic. Many of such vinyl polymers which have been heretofore been produced are isotactic or atactic.

Most of styrene polymers which have heretofore been produced are atactic although when usual radical polymerization initiators are used, there can be obtained styrene polymers having a stereo structure that is somewhat rich in the syndiotactic configuration. It is also known that when Ziegler type catalysts are used, there can be obtained styrene polymers having an isotactic structure.

However a method whereby styrene polymers of high syndiotactic configuration can be produced efficiently has not been known.

The present inventors have succeeded in developing a process for efficiently producing styrene polymers having a stereo structure that side chains are mainly in the syndiotactic configuration (see Japanese Patent Application Laid-Open No. 104818/1987).

In accordance with the above process, there can be obtained styrene polymers having a stereo structure that side chains are mainly in the syndiotactic configuration, but the molecular weight of the styrene polymers is difficult to control even if operations such as controlling the polymerization temperature are applied.

SUMMARY OF THE INVENTION

The present invention is intended to overcome the above problem and an object of the present invention is to provide a process for efficiently producing styrene polymers having a syndiotactic configuration in which the molecular weight of the styrene polymers can be controlled very accurately and easily.

It has now been found that when styrene monomers are polymerized by the use of a catalyst comprising specified transition metal compound and organoaluminum compound components, and further in the presence of hydrogen, the above object can be attained.

The present invention relates to a process for producing styrene polymers which comprises polymerizing styrene monomers by the use of a catalyst comprising (a) a titanium compound and (b) a contact product of an organoaluminum compound and a condensing agent, and further in the presence of hydrogen.

DESCRIPTION OF THE PREFERRED EMBODIMENT

The catalyst used in the process of the present invention comprises, as described above, (a) a titanium compound and (b) a contact product of an organoaluminum compound and a condensing agent.

As the above titanium component (a), various titanium compounds can be used. Preferred are the compounds represented by the following general formulae (I) and (II): General Formula (I):

General Formula (II)

(wherein $R^1$, $R^2$ and $R^3$ are each a hydrogen atom, an alkyl group having 1 to 20 carbon atoms, an alkoxy group having 1 to 20 carbon atoms, an aryl group having 6 to 20 carbon atoms, an alkylaryl group having 6 to 20 carbon atoms, an arylalkyl group having 6 to 20 carbon atoms, an acyloxy group having 1 to 20 carbon atoms, a cyclopentadienyl group, a substituted cyclopentadienyl group having 5 to 20 carbon atoms, or an indenyl group, $X^1$ is a halogen atom, a, b and c are each an integer of 0 to 4, and d and e are each an integer of 0 to 3). That is, as the above titanium component (a), at least one compound selected from the titanium compounds represented by the general formulae (I) and (II) is preferably used.

The alkyl group having 1 to 20 carbon atoms as represented by $R^1$, $R^2$ and $R^3$ in the general formulae (I) and (II) includes a methyl group, an ethyl group, a propyl group, a butyl group, an amyl group, an isoamyl group, an isobutyl group, an octyl group, and a 2-ethylhexyl group. The alkoxy group having 1 to 20 carbon atoms as represented by $R^1$, $R^2$ and $R^3$ includes a methoxy group, an ethoxy group, a propoxy group, a butoxy group, an amyloxy group, a hexyloxy group, and a 2-ethylhexyloxy group. The aryl group, the alkylaryl group, and the arylalkyl group each having 6 to 20 carbon atoms, as represented by $R^1$, $R^2$ and $R^3$ include a phenyl group, a tolyl group, a xylyl group, and a benzyl group.

The acyloxy group having 1 to 20 carbon atoms as represented by $R^1$, $R^2$ and $R^3$ includes a heptadecylcarbonyloxy group.

The substituted cyclopentadienyl group having 5 to 20 carbon atoms as represented by $R^1$, $R^2$ and $R^3$ includes a methylcyclopentadienyl group, a 1,2-dimethylcyclopentadienyl group, and a pentamethylcyclopentadienyl group.

$R^1$, $R^2$ and $R^3$ may be the same or different.

Typical examples of the tetravalent titanium compounds and titanium chelate compounds represented by the general formula (I) are methyltitanium trichloride, titanium tetramethoxide, titanium tetraethoxide, titanium monoisopropoxytrichloride, titanium diisopropoxydichloride, titanium triisopropoxymonochloride, tetra(2-ethylhexyoxy)titanium, cyclopentadienyltitanium trichloride, biscyclopentadienyltitanium dichloride, titanium tetrachloride, titanium tetrabromide, bis(2,4-pentanedionate)titanium oxide, bis(2,4-pentanedionate)titanium chloride, and bis(2,4-pentanedionate)titanium dibutoxide.

In addition, as the titanium component (a), condensed titanium compounds represented by the general formula (III):

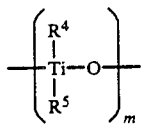

(wherein $R^4$ and $R^5$ are each a halogen atom, an alkoxy group having 1 to 20 carbon atoms, or an acyloxy group having 1 to 20 carbon atoms, and m is a number of 2 to 20) can be used.

The above titanium compounds can be used in the form that is absorbed or deposited on a carrier such as magnesium compounds, silica or alumina, or in a complex form with esters or ethers.

Typical examples of the trivalent titanium compounds represented by the general formula (II) are titanium trihalide such as titanium trichloride, and cyclopentadienyltitanium compounds such as cyclopentadienyltitanium dichloride. In addition, titanium compounds as derived by reduction of tetravalent titanium compounds can be used.

These trivalent titanium compounds can be used as complexes with, e.g., esters or ethers.

The aluminum component (b) as the other component of the catalyst of the present invention is prepared by contacting an organoaluminum compound and a condensing agent.

As the above organoaluminum compound, compounds represented by the general formula (IV):

(wherein $R^6$ is an alkyl group having 1 to 8 carbon atoms) are usually used. Examples of the compounds represented by the general formula (IV) are trimethylaluminum, triethylaluminum, and triisobutylaluminum. Of these compounds, trimethylaluminum is most preferred.

A typical example of the condensing agent is water. In addition, any compounds capable of undergoing a condensation reaction with organoaluminum can be used.

The reaction product of an alkylaluminum compound and water, which is a typical example of the aluminum component (b), is alkylaluminoxane represented by the general formula (V):

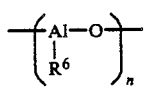

(wherein n is a number of 2 or more, preferably 2 to 50).

The reaction between the organoaluminum compound, such as an alkylaluminum compound, and the condensing agent in the preparation of the aluminum component is not critical; that is, the aluminum component (b) can be prepared by reacting the organoaluminum compound and the condensing agent according to the known techniques. For example, (1) a method in which the organoaluminum compound is dissolved in an organic solvent, and the resulting solution is brought into contact with the condensing agent, e.g., water; (2) a method in which at the time of polymerization the organoaluminum compound is first added and, thereafter, the condensing agent, e.g., water is added; and (3) a method in which the organoaluminum compound is reacted with water of crystallization contained in metal salts and so forth, or water absorbed onto organic or inorganic substances can be employed.

The aluminum component (b) can be used as such in combination with the above titanium component (a). In addition, the aluminum component (b) may be used in admixture with organoaluminum compounds, e.g., those represented by the general formula (IV), or other organometallic compounds, or in the form that is absorbed or deposited on inorganic substances, for example.

The catalyst used in the process of the present invention contains the above titanium component (a) and aluminum component (b) as the main components. If desired, other suitable catalyst components may be added.

The ratio of the titanium component (a) to the aluminum component (b) in the catalyst cannot be determined unconditionally because it varies depending on the type of each component, the type of the styrene monomer starting material, and so forth. Usually the molar ratio of aluminum in the aluminum component (b) to titanium in the titanium component (a), i.e., aluminum/titanium molar ratio, is 1:1 to $1\times10^6:1$, with the range of 10:1 to $1\times10^4:1$ being preferred.

Styrene monomers used in the process of the present invention include, as well as styrene, alkylstyrenes such as methylstyrene, ethylstyrene, butylstyrene, p-tert-butylstyrene and dimethylstyrene, halogenated styrenes such as chlorostyrene, bromostyrene and fluorostyrene, halogen-substituted alkylstyrenes such as chloromethylstyrene, alkoxystyrenes such as methoxystyrene, carboxymethylstyrene, alkylsilylstyrenes, vinylbenzenesulfonic acid esters, and vinylbenzenedialkoxy phosphides. These styrene monomers can be alone or in combination with each other.

The polymerization of the above styrene monomers according to the process of the present invention may be bulk polymerization or solution polymerization. In the case of the solution polymerization, as the solvent, aliphatic hydrocarbons such as pentane, hexane and heptane, alicyclic hydrocarbons such as cyclohexane, and aromatic hydrocarbons such as benzene, toluene and xylene can be used. In addition, the polymerization may be carried out in the styrene monomer as starting material.

The polymerization temperature is not critical; it is usually 0° to 90° C. and preferably 20° to 70° C.

The process of the present invention is required to be carried out in the presence of hydrogen. The hydrogen partial pressure is not critical and can be determined appropriately depending on the molecular weight of the styrene polymers to be produced, the type of the catalyst used, the polymerization temperature and so forth. In general, the hydrogen partial pressure is chosen within the range of 0.01 to 50 kg/cm². Polymerization of the above styrene monomers in the presence of hydrogen results in the corresponding styrene polymers having the desired molecular weight.

The styrene polymers produced by the process of the present invention include both homopolymers and copolymers.

The term "a stereo structure that substituent groups are mainly in the syndiotactic configuration" means that the degree of syndiotacticity in terms of racemic diad as determined by an NMR (nuclear magnetic resonance) analysis is higher than those of styrene polymers produced by the conventional radical polymerization. Thus, the styrene polymers produced by the process of the present invention include polystyrene having a methyl ethyl ketone-insoluble content of at least 75 wt % and polymethylstyrene having a methyl ethyl ketone-insoluble content of at least 85%.

The process of the present invention produces various advantages. Some of major advantages of the present invention are shown below.

(1) Styrene polymers such as polystyrene, polyalkylstyrene and poly(halogenated styrene), having a stereostructure that substituent groups are mainly in the syndiotactic configuration, or styrene polymers containing the above styrene polymers having mainly the syndiotactic configuration can be produced efficiently.

(2) The molecular weight of the styrene polymers to be produced by the process of the present invention can be controlled with ease depending on the purpose of use of the styrene polymers.

(3) During the process of polymerization, the attachment of the styrene polymers formed to the walls of the reactor can be efficiently prevented.

(4) Of the styrene polymers having a stereo structure that substituent groups are mainly in the syndiotactic configuration, crystalline styrene polymers have high heat resistance and high solvent resistance as compared with atactic polystyrene generally used. Thus the crystalline styrene polymers are useful as materials for use in production of articles for which high heat resistance and high chemical resistance are required, and also as modifying materials to be blended with other resins. Even noncrystalline styrene polymers can be utilized effectively and widely as intermediate materials for functional polymers by introducing various functional groups in the side chains of benzene ring and thus utilizing the regularity of the side chains.

The present invention is described in greater detail with reference to the following examples.

EXAMPLE 1

(1) Preparation of Aluminum Component (b)

In 200 milliliters (ml) of toluene as a solvent, 47.4 ml (0.492 mol) of trimethylaluminum and 35.5 g (0.142 mol) of copper sulfate pentahydrate were reacted at 20° C for 24 hours, and then the solids were removed from the reaction mixture to obtain a toluene solution containing 12.4 g of methylaluminoxane as the aluminum component (b).

(2) Polymerization of Styrene

In a 1-liter innervolume reactor, 50 ml of toluene, 0.075 millimole (mmol) of tetraethoxy titanate and 7.5 mmol (as aluminum atom) of the methylaluminoxane obtained in (1) above were placed. Then, 225 ml of styrene was introduced in the reactor at 40° C and subsequently hydrogen was introduced therein until the hydrogen partial pressure reached 0.5 kg/cm$^2$. Polymerization was performed for 1.5 hours. After the completion of the reaction, the reaction product was washed with a hydrochloric acid-methanol mixture, decomposing the catalyst component and then dried to obtain 15.0 g of polystyrene.

For the polystyrene thus obtained, the weight average molecular weight was 110,000 and the number average molecular weight was 7,600. In a $^{13}$C-NMR (nuclear magnetic resonance spectrum using isotopic carbon) analysis of the polystyrene, a peak ascribable to the syndiotactic configuration was observed at 145.35 ppm. The tacticity in terms of pentad as calculated based on the above peak was 98%.

The results are shown in Table 1.

In the above polymerization reaction, no attachment of the polystyrene to the walls of the reactor was observed.

EXAMPLE 2

The procedure of Example 1 was repeated with the exception that hydrogen was introduced until the hydrogen partial pressure reached 1 kg/cm$^2$.

The results are shown in Table 1.

EXAMPLE 3

The procedure of Example 1 was repeated with the exception that hydrogen was introduced until the hydrogen partial pressure reached 5 kg/cm$^2$.

The results are shown in Table 1.

COMPARATIVE EXAMPLE 1

The procedure of Example 1 was repeated with the exception that hydrogen was not introduced.

The results are shown in Table 1.

A large amount of polystyrene attached to the walls of the reactor.

EXAMPLE 4

In a 1-liter innervolume reactor, 150 ml of toluene, 0.0375 mmol of cyclopentadienyltitanium trichloride, and 22.5 mmol (as aluminum atom) of the methylaluminoxane obtained in (1) of Example 1 were placed. Then, 150 ml of styrene was introduced in the reactor at 30° C. and hydrogen was introduced therein until the hydrogen partial pressure reached 0.5 kg/cm$^2$. Polymerization was performed for 1.5 hours. After the completion of the reaction, the reaction product was washed with a hydrochloric acid-methanol mixture, decomposing the catalyst component, and then dried to obtain 18.0 g of polystyrene.

The weight average molecular weight of the polystyrene obtained above was 64,000, and the number average molecular weight was 8,400.

The results are shown in Table 1.

EXAMPLE 5

The procedure of Example 4 was repeated with the exception that hydrogen was introduced until the hydrogen partial pressure reached 1.0 kg/cm$^2$.

The results are shown in Table 1.

EXAMPLE 6

The procedure of Example 4 was repeated with the exception that hydrogen was introduced until the hydrogen partial pressure reached 2.0 kg/cm$^2$.

The results are shown in Table 1.

COMPARATIVE EXAMPLE 2

The procedure of Example 4 was repeated with the exception that hydrogen was not introduced in the reactor.

The results are shown in Table 1.

A large amount of polystyrene attached to the walls of the reactor.

TABLE 1

| Run No. | Titanium Compound | Amount of Hydrogen Supplied (kg/cm²) | Yield of Polymer (g) | Tacticity (%) | Weight Average Molecular Weight | Number Average Molecular Weight |
| --- | --- | --- | --- | --- | --- | --- |
| Example 1 | TET*1 | 0.5 | 15.0 | 98 | 110,000 | 7,600 |
| Example 2 | " | 1.0 | 12.0 | 98 | 65,000 | 4,200 |
| Example 3 | " | 5.0 | 6.0 | 97 | 16,000 | 3,000 |
| Comparative Example 1 | " | none | 12.0 | 98 | 930,000 | 360,000 |
| Example 4 | cpTiCl₃*2 | 0.5 | 18.0 | 98 | 64,000 | 8,400 |
| Example 5 | " | 1.0 | 19.0 | 98 | 65,000 | 9,400 |
| Example 6 | " | 2.0 | 19.0 | 98 | 50,000 | 7,000 |
| Comparative Example 2 | " | none | 11.0 | 98 | 180,000 | 67,000 |

*1 Tetraethoxy titanate
*2 Cyclopentadienyltitanium trichloride

What is claimed is:

1. A process for producing a styrene polymer having a syndiotactic configuration which comprises polymerizing a styrene mounted by the use of a catalyst comprising
   (a) a titanium compound represented by the following formulae (I) and (II), and
   (b) methylaluminoxane, and further in the presence of hydrogen, Formula (I):

$$TiR^1_a R^2_b R^3_c X^1_{4-(a+b+c)} \quad (I)$$

Formula (II)

$$TiR^1_d R^2_e X^1_{3-(d+e)} \quad (II)$$

wherein R', $R^2$ and $R^3$ are each a hydrogen atom, an alkyl group having 1 to 20 carbon atoms, an alkoxy group having 1 to 20 carbon atoms, an aryl group having 6 to 20 carbon atoms, an alkylaryl group having 6 to 20 carbon atoms, an arylalkyl group having 6 to 20 carbon atoms, an acyloxy group having 1 to 20 carbon atoms, a cyclopentadienyl group, a substituted cyclopentadienyl group having 5 to 20 carbon atoms, or an indenyl group, X' is a halogen atom, a, b and c are each an integer of 0 to 4, and d and e are each an integer of 0 to 3.

2. The process as claimed in claim 1 wherein the hydrogen partial pressure is 0.01 to 50 kg/cm².

3. The process of claim 1 wherein said compound of formula I is used.

4. The process of claim 3 wherein said compound of formula (I) is methyltitanium trichloride, titanium tetramethoxide, titanium tetraethoxide, titanium monoisopropoxytrichloride, titanium diisopropoxychloride, titanium triisopropoxymonochloride, tetra(2-ethylhexyloxy) titanium, cyclopentadienyltitanium trichloride, biscyclopentadienyltitanium dichloride, titanium tetrachloride, titanium tetrabromide, bis(2,4-pentanedionate) titanium oxide, bis(2,4-pentanedionate)titanium chloride, or bis(2,4-pentanedionate)-titanium dibutoxide.

5. The process of claim 1 wherein said compound of general formula II is used.

6. The process of claim 5 wherein said compound of formula II is a titanium trihalide or a compound wherein $R^1$ is cyclopentadienyl.

7. The process of claim 1 wherein the styrene monomer is styrene, alkylstyrene, halogenated styrene, halogen substituted alkyl styrene, alkoxystyrene, carboxyethylstyrene, alkylsililylstyrene, vinylbenzoicsulfonic acid esters, or vinylbenzenedialkoxy phosphides or any combination thereof.

8. The process of claim 1 wherein the styrene monomer is styrene, methylstyrene, ethylstyrene, butylstyrene, p-tert-butylstyrene or dimethylstyrene.

9. The process of claim 1 wherein the styrene monomer is chlorostyrene, bromostyrene, fluorostyrene, chloromethylstyrene or methoxystyrene.

10. The process of claim 1 wherein the styrene monomer is chloromethylstyrene or methoxystyrene.

* * * * *

UNITED STATES PATENT AND TRADEMARK OFFICE
CERTIFICATE OF CORRECTION

PATENT NO. : 4,990,580
DATED : February 5, 1991
INVENTOR(S) : ISHIHARA et al It is certified that error appears in the above-identified patent and that said Letters Patent is hereby corrected as shown below:

TITLE PAGE:

Section [56] References Cited, under "U.S. PATENT DOCUMENTS", insert the following references:

```
3,534,006  10/1970  Kamaishi et al
3,639,332   2/1972  Coover et al
```

Signed and Sealed this

Twelfth Day of January, 1993

*Attest:*

DOUGLAS B. COMER

*Attesting Officer*    *Acting Commissioner of Patents and Trademarks*